United States Patent
Maly

(10) Patent No.: US 9,853,570 B2
(45) Date of Patent: Dec. 26, 2017

(54) PARALLEL INVERTER SCHEME FOR SEPARATING CONDUCTION AND SWITCHING LOSSES

(71) Applicant: Deere & Company, Moline, IL (US)

(72) Inventor: Doug Maly, Fargo, ND (US)

(73) Assignee: DEERE & COMPANY, Moline, IL (US)

(*) Notice: Subject to any disclaimer, the term of this patent is extended or adjusted under 35 U.S.C. 154(b) by 0 days.

(21) Appl. No.: 15/210,305

(22) Filed: Jul. 14, 2016

(65) Prior Publication Data

US 2017/0250623 A1 Aug. 31, 2017

Related U.S. Application Data

(60) Provisional application No. 62/300,292, filed on Feb. 26, 2016.

(51) Int. Cl.
| | |
|---|---|
| *H02P 6/14* | (2016.01) |
| *H02M 7/537* | (2006.01) |
| *H02M 1/088* | (2006.01) |
| *H02P 27/08* | (2006.01) |
| *H02M 1/00* | (2006.01) |
| *H02M 7/48* | (2007.01) |

(52) U.S. Cl.
CPC .......... *H02M 7/537* (2013.01); *H02M 1/088* (2013.01); *H02P 27/08* (2013.01); *H02M 2001/0054* (2013.01); *H02M 2007/4822* (2013.01)

(58) Field of Classification Search
USPC ............ 318/801, 400.2, 400.26, 400.17, 504
See application file for complete search history.

(56) References Cited

U.S. PATENT DOCUMENTS

| | | | |
|---|---|---|---|
| 4,149,233 A | | 4/1979 | Frosch et al. |
| 5,349,269 A | * | 9/1994 | Kimball ................. H05B 33/08 315/160 |

(Continued)

FOREIGN PATENT DOCUMENTS

EP 1792770 A2 6/2017

OTHER PUBLICATIONS

Current Hormonic Analysis of a Dual Two Level Inverter Fed Open-End Winding Induction Motor Drive Based on SVPWM Switching Stratagies. Dr. K. Sri Gowri, S. Venkata Mahesh and M.Abdul Hakeem. International Journal of Modern Engineering Research (IJMER) www.ijmer.com vol. 2, Issue.4, Jul.-Aug. 2012 pp. 2561-2567 ISSN: 2249-6645.*

(Continued)

*Primary Examiner* — Jorge L Carrasquillo
(74) *Attorney, Agent, or Firm* — Harness, Dickey & Pierce, P.L.C.

(57) ABSTRACT

In one example embodiment, a controller is coupled to a first inverter and a second inverter forming a parallel inverter scheme. The first inverter and the second inverter are configured to provide power to a load. The controller is configured to control the first inverter to operate according to a first operating state, while the second inverter is off, and turn off the first inverter before transition from the first operating state to a second operating state. The controller is further configured to control the second inverter to at least partially operate during the transition.

15 Claims, 13 Drawing Sheets

(56) References Cited

U.S. PATENT DOCUMENTS

| | | | | |
|---|---|---|---|---|
| 5,450,309 | A * | 9/1995 | Rohner | H02M 7/493 |
| | | | | 307/82 |
| 5,657,217 | A * | 8/1997 | Watanabe | H02M 7/49 |
| | | | | 363/71 |
| 7,564,703 | B1 * | 7/2009 | Braun | H02M 7/493 |
| | | | | 363/34 |
| 8,054,032 | B2 * | 11/2011 | Chakrabarti | B60L 11/1868 |
| | | | | 180/65.1 |
| 9,306,488 | B2 * | 4/2016 | Soh | H02P 27/08 |
| 2006/0226703 | A1 | 10/2006 | Schreiber | |
| 2009/0033251 | A1 | 2/2009 | Perisic et al. | |
| 2010/0141189 | A1 * | 6/2010 | Matt | H02M 7/5387 |
| | | | | 318/400.26 |
| 2011/0133677 | A1 | 6/2011 | Franke | |
| 2013/0271056 | A1 * | 10/2013 | Bunte | F03D 7/0224 |
| | | | | 318/503 |
| 2016/0352278 | A1 * | 12/2016 | Jiang | B66B 1/308 |
| 2016/0373044 | A1 * | 12/2016 | Chi | H02P 27/08 |

OTHER PUBLICATIONS

Gowri, "Current Harmonic Analysis of Dual Two Level Inverter Fed Open-End Winding Induction Motor Drive Based on SVPWM Switching Strategies", Int. Journal of Modern Engineering Research, vol. 2, Issue 4, Jul.-Aug. 2012, pp. 2561-2567.

Pei, "Auto-Master-Slave Control Technique of Parallel Inverters in Distributed AC Power Systems and UPS", 2004 35th Annual IEEE Power Electronics Specialists Conference, 2004 pp. 2050-2053.

Office Action corresponding GB application GB1701911.8, dated Jun. 22, 2017.

* cited by examiner

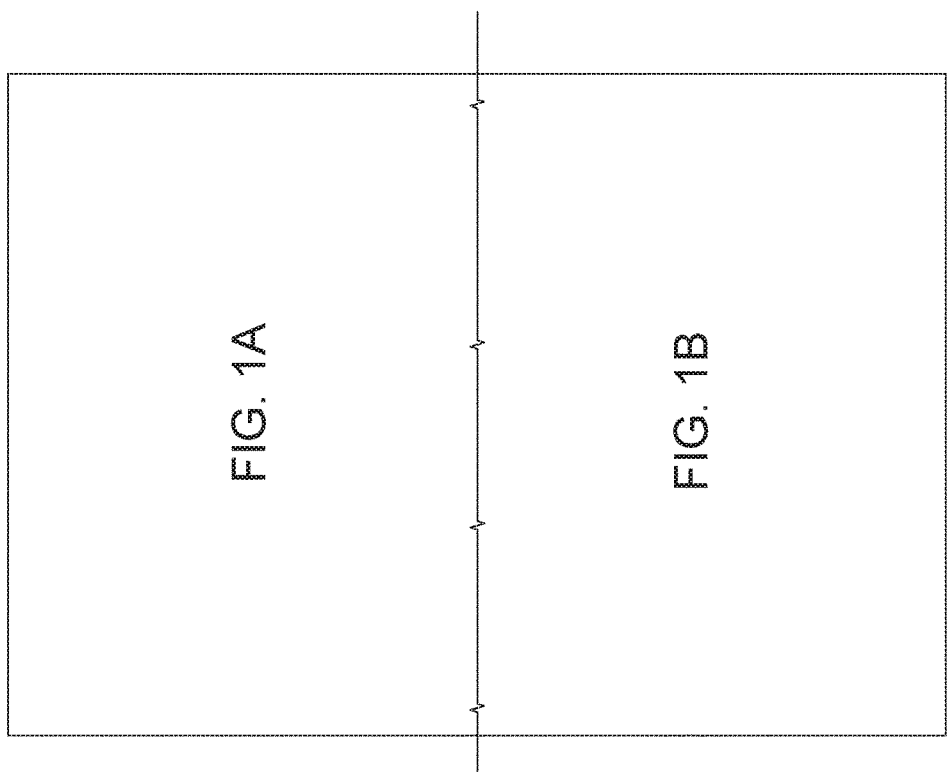

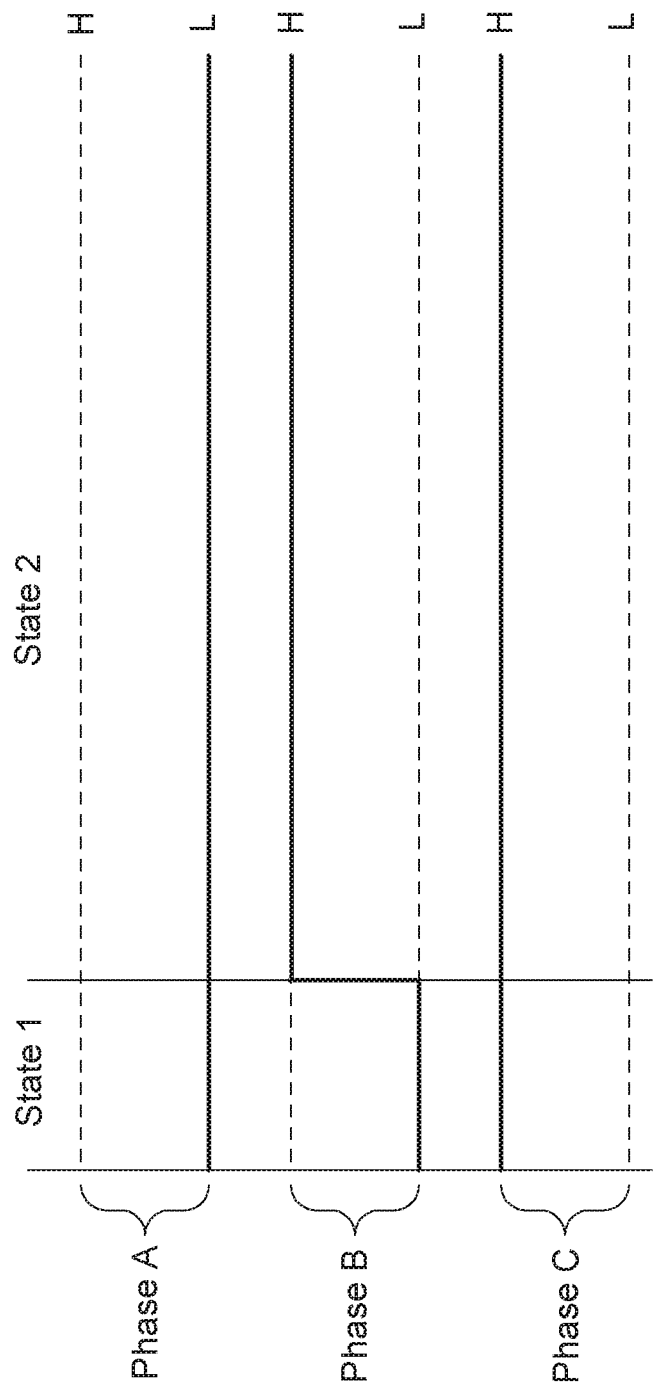

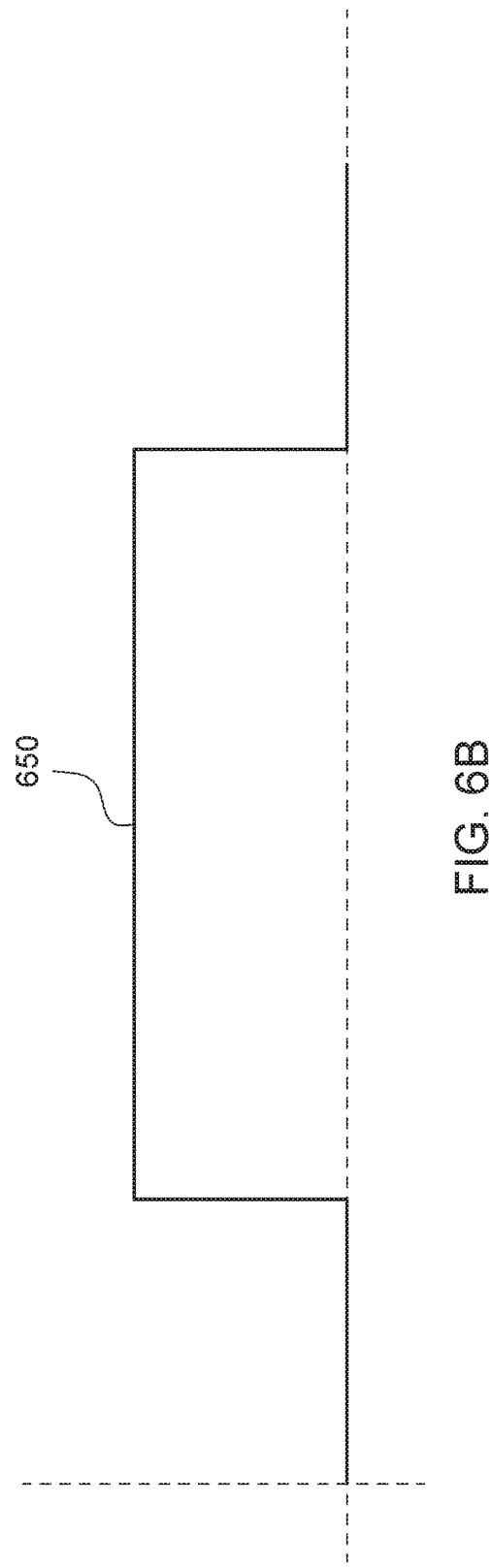

PARALLEL INVERTER SCHEME FOR SEPARATING CONDUCTION AND SWITCHING LOSSES

CROSS-REFERENCE TO RELATED APPLICATIONS

This application claims priority under 35 U.S.C. §119(e) to U.S. provisional patent application No. 62/300,292 filed on Feb. 26, 2016, the entire content of which is hereby incorporated by reference.

FIELD

Example embodiments are related to electronic drive device systems and parallel inverter schemes used for driving and controlling alternating current (AC) devices such as Induction Machines or Interior Permanent Magnet (IPM) motors or machines.

BACKGROUND

Various applications of AC devices, for example in electric automobiles or off-highway heavy duty vehicles, demand the use of inverters (power electronic switching devices) that are capable of handling large current requirements for such applications.

Currently, one solution for meeting these demands is to design application-specific inverters for handling large currents. However, current handling capabilities of application-specific inverters may be extended up to a limit. Furthermore, the design of application-specific inverters may become cost-prohibitive depending on how large of a current they have to be able to handle.

Another solution for meeting these demands is to buy larger and larger off the shelf inverters, if they exist. However, such inverters also have performance limits and may become cost prohibitive depending on how large of a current they have to be able to handle.

Yet another solution for meeting these demands is to combine smaller inverters to form a parallel inverter scheme. Accordingly, two smaller inverters may be combined to form one larger inverter. This solution may be referred to as a current sharing scheme. However, existing current sharing schemes are inefficient because slight variations in the two inverters may result in an imbalance situation which leads to overcurrent/overheating in one or more of the smaller inverters, ultimately resulting in the shutdown of the system.

More specifically, in a current sharing scheme, the switches used in the inverters do not match exactly and they do not share current equally when conducting. Accordingly, the switches may have to be sorted and mated to make sure they match, which is costly and inefficient. Furthermore, the switches in the parallel inverters never switch at exactly the same time. For example, when two switches are commanded to be ON at once, one will always come on first. As such, the 'first' switch will carry double the current while the second switch carries zero current. Therefore, the first inverter runs extra hot while the second runs extra cool, leading to overcurrent/overheating in one of the inverters associated with the 'first' switch. Solutions to address these problems include introducing special filters and/or special cabling (e.g., individual cables of a required length or inductance) to mitigate the undesirable effects. However, these solutions introduce additional signaling and/or additional hardware components into the system, which increase system complexity, design costs and/or inefficiencies.

SUMMARY

Some example embodiments are directed to methods and apparatuses for controlling a power electronic inverter.

In one example embodiment, a controller is coupled to a first inverter and a second inverter forming a parallel inverter scheme. The first inverter and the second inverter are configured to provide power to a load. The controller is configured to control the first inverter to operate according to a first operating state, while the second inverter is off, and turn off the first inverter before transition from the first operating state to a second operating state. The controller is further configured to control the second inverter to at least partially operate during the transition.

In one example embodiment, a voltage command generator is coupled to a parallel inverter scheme having a first inverter and a second inverter. The voltage command generator is configured to receive a plurality of voltage commands from a machine controller and generate a first command and second command based on each of the received voltage commands to control the first inverter to operate according to a first operating state, while the second inverter is off, and turn off the first inverter before transition from the first operating state to a second operating state. The voltage command generator is further configured to control the second inverter to at least partially operate during the transition.

In one example embodiment, a parallel inverter scheme includes a first inverter configured to receive voltage commands from a machine controller, operate according to a first operating state, while a second inverter of the parallel inverter scheme is off, and turn off before transition from the first operating state to a second operating state. The parallel inverter scheme further includes the second inverter configured to receive the voltage commands from the machine controller, and at least partially operate during the transition.

BRIEF DESCRIPTION OF THE DRAWINGS

Example embodiments will be more clearly understood from the following detailed description taken in conjunction with the accompanying drawings. FIGS. 1-5B represent non-limiting, example embodiments as described herein.

FIG. 1 is a block diagram of a system for controlling an electrical motor, according to an example embodiment;

FIG. 2 is a block diagram of an electronic data processing system consistent with FIG. 1, according to an example embodiment;

FIG. 3B is a state diagram illustrating two different states of the single inverter switching circuit of FIG. 3A;

FIG. 5 illustrates a method of driving a parallel inverter scheme, as shown in FIGS. 4A and 4B, according to an example embodiment;

FIG. 6B illustrate a form of a control command, according to one example embodiment.

DETAILED DESCRIPTION

Figure 1A:
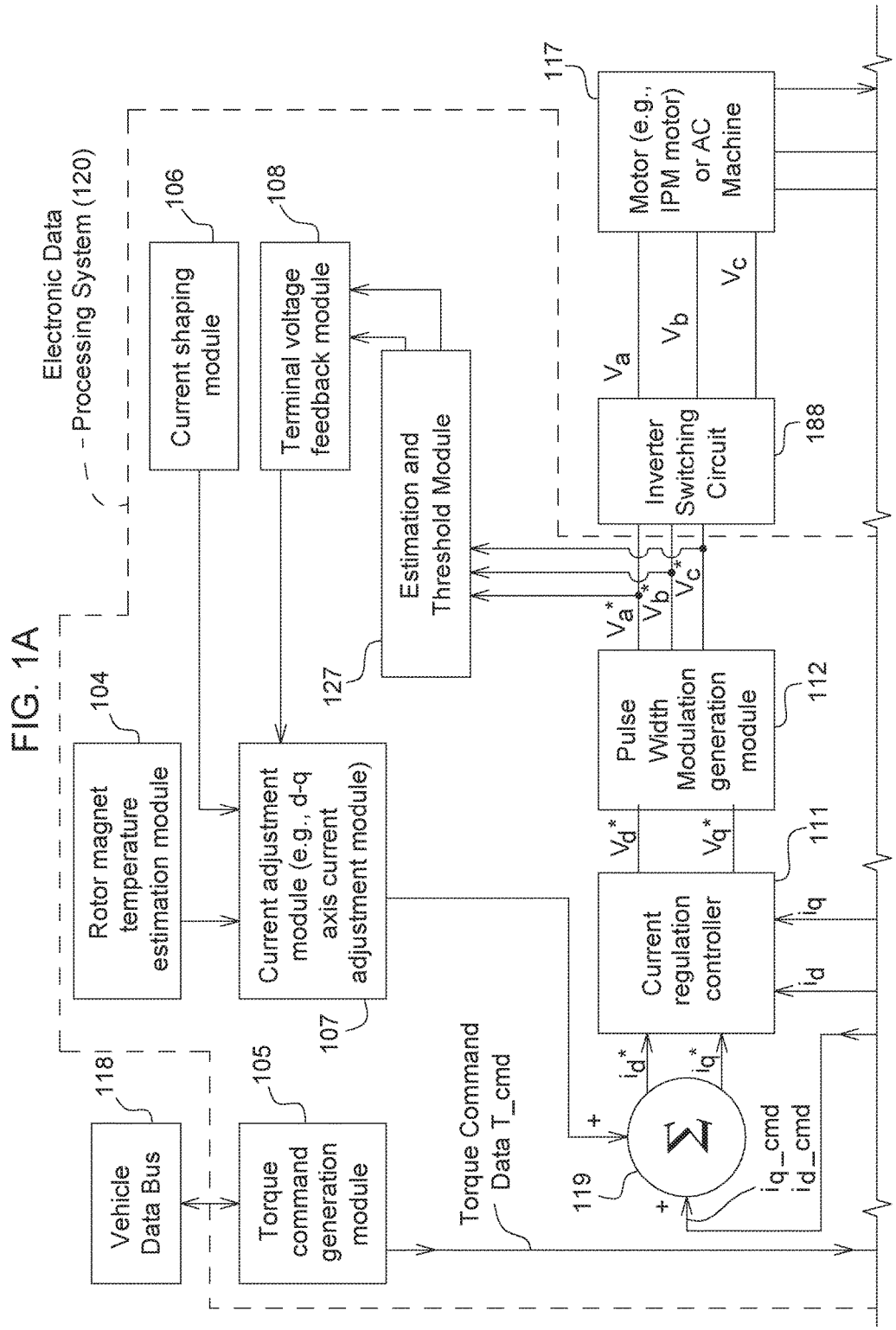
FIG. 1A illustrates a first portion of the system of FIG. 1, according to an example embodiment.

Some example embodiments will now be described more fully with reference to the accompanying drawings in which some example embodiments are illustrated.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Further, at least one embodiment of the invention relates to a non-transitory computer-readable storage medium comprising electronically readable control information stored thereon, configured in such that when the storage medium is used in a controller of a magnetic resonance device, at least one embodiment of the method is carried out.

Even further, any of the aforementioned methods may be embodied in the form of a program. The program may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

Note also that the software implemented aspects of example embodiments are typically encoded on some form of tangible (or recording) storage medium or implemented over some type of transmission medium. The tangible storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. Example embodiments are not limited by these aspects of any given implementation.

In one example embodiment, a controller is coupled to a first inverter and a second inverter forming a parallel inverter scheme. The first inverter and the second inverter are configured to provide power to a load. The controller is configured to control the first inverter to operate according to a first operating state, while the second inverter is off, and turn off the first inverter before transition from the first operating state to a second operating state. The controller is further configured to control the second inverter to at least partially operate during the transition.

In yet another example embodiment, the controller is configured to at least partially turn on the second inverter, and turn off the first inverter after partially turning on the second inverter such that the operation of the first inverter and the operation of the second inverter partially overlap before the first inverter is turned off.

In yet another example embodiment, the controller is configured to turn on the first inverter in the second operating state before turning off the at least partially operating second inverter such that the operation of the first inverter and the operation of the second inverter partially overlap before the at least partially operating second inverter is turned off, and turn off the at least partially operating second inverter.

In yet another example embodiment, the first inverter includes a first plurality of pairs of switches, the second inverter includes a second plurality of pairs of switches, and in controlling the second inverter to at least partially operate, the controller is configured to turn on one or more of the second plurality of pairs of switches of the second inverter corresponding to one or more of the first plurality of pairs of switches of the first inverter that operate differently in the second operating state compared to the first operating state.

In yet another example embodiment, the first inverter is comprised of a first plurality of transistors, and the second inverter is comprised of a second plurality of transistors.

In yet another example embodiment, each of the first plurality of transistors and the second plurality of transistors are power switches.

In yet another example embodiment, the controller is configured to supply a first set of voltages to the first inverter and a second set of voltages to the second inverter for controlling the first inverter and the second inverter based on current requirements and feedback from the first inverter and the second inverter.

In one example embodiment, a voltage command generator is coupled to a parallel inverter scheme having a first inverter and a second inverter. The voltage command generator is configured to receive a plurality of voltage commands from a machine controller and generate a first command and second command based on each of the received voltage commands to control the first inverter to operate according to a first operating state, while the second inverter is off, and turn off the first inverter before transition from the first operating state to a second operating state. The voltage command generator is further configured to control the second inverter to at least partially operate during the transition.

In yet another example embodiment, the voltage command generator is configured to at least partially turn on the second inverter, and turn off the first inverter after partially turning on the second inverter such that the operation of the first inverter and the operation of the second inverter partially overlap before the first inverter is turned off.

In yet another example embodiment, the voltage command generator is configured to, turn on the first inverter in the second operating state before turning off the at least partially operating second inverter such that the operation of the first inverter and the operation of the second inverter partially overlap before the at least partially operating second inverter is turned off, and turn off the at least partially operating second inverter.

In yet another example embodiment, the first inverter includes a first plurality of pairs of switches, the second inverter include a second plurality of pairs of switches, and in controlling the second inverter to at least partially operate, the voltage command generator is configured to turn on one or more of the second plurality of pairs of switches of the second inverter corresponding to one or more of the first plurality of pairs of switches of the first inverter that operate differently in the second operating state compared to the first operating state.

In yet another example embodiment, the first inverter is comprised of a first plurality of transistors, and the second inverter is comprised of a second plurality of transistors.

In yet another example embodiment, each of the first plurality of transistors and the second plurality of transistors are power switches.

In yet another example embodiment, the machine controller is configured to provide the plurality of voltage commands according to current requirements and feedback from the first inverter and the second inverter.

In one example embodiment, a parallel inverter scheme includes a first inverter configured to receive voltage commands from a machine controller, operate according to a first operating state, while a second inverter of the parallel inverter scheme is off, and turn off before transition from the first operating state to a second operating state. The parallel inverter scheme further includes the second inverter configured to receive the voltage commands from the machine controller, and at least partially operate during the transition.

In yet another example embodiment, the second inverter is configured to at least partially turn on, and the first inverter is configured to turn off after the second inverter is turned on such that the operation of the first inverter and the operation of the second inverter partially overlap before the first inverter is turned off.

In yet another example embodiment, the first inverter is configured to turn on in the second operating state before the at least partially operating second inverter is tuned off such that the operation of the first inverter and the operation of the second inverter partially overlap before the at least partially operating second inverter is turned off, and the at least partially operating second inverter is configured to turn off.

In yet another example embodiment, the first inverter includes a first plurality of pairs of switches, the second inverter include a second plurality of pairs of switches, and while at least partially operating, the second invertor is configured to turn on one or more of the second plurality of pairs of switches of the second inverter corresponding to one or more of the first plurality of pairs of switches of the first inverter that operate differently in the second operating state compared to the first operating state.

In yet another example embodiment, the first inverter is comprised of a first plurality of transistors, and the second inverter is comprised of a second plurality of transistors.

In yet another example embodiment, each of the first plurality of transistors and each of the second plurality of transistors are power switches.

Figure 1B:
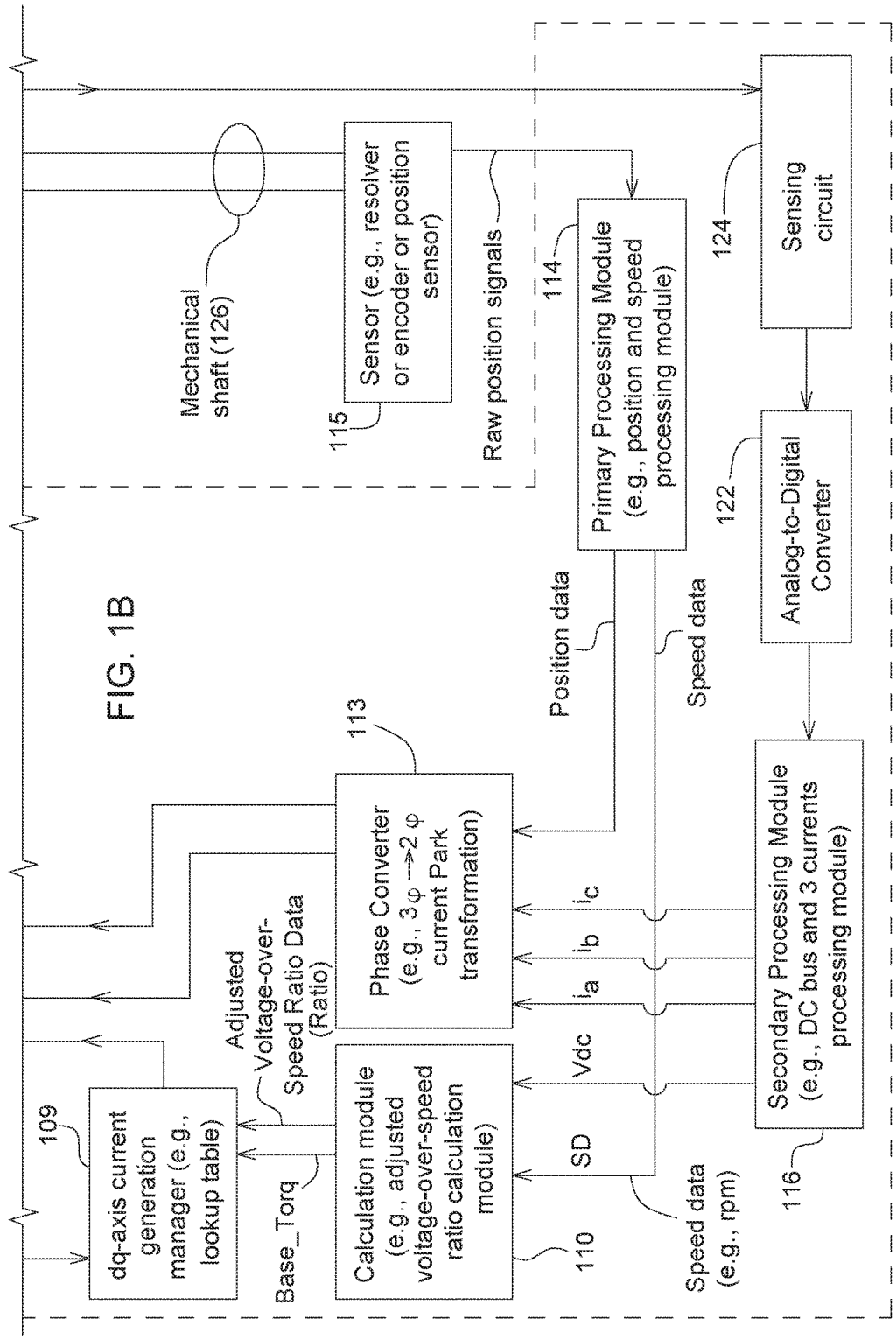
FIG. 1B illustrates a second portion of the system of FIG. 1, according to an example embodiment.

FIG. 1 is a block diagram of a system for controlling an electrical motor, according to an example embodiment. FIG. 1A illustrates a first portion of the system of FIG. 1, according to an example embodiment. FIG. 1B illustrates a second portion of the system of FIG. 1, according to an example embodiment. The electrical motor may be a motor such as a motor 117 (e.g., an interior permanent magnet (IPM) motor) or another alternating current machine controlled by the electronic data processing system 120. Hereinafter, the terms, hybrid machine, electrical motor, AC machine and a motor may be used interchangeably. The motor 117 has a nominal dc bus voltage (e.g., 320 Volts). The nominal voltage is a named voltage. For example, a nominal voltage of the motor 117 may be 320 Volts, but the motor may operate at a voltage above and below 320 Volts. Hereinafter, the motor 117 may also be referred to as the load 117.

In an example embodiment, the electronic data processing system 120 may be referred to as a motor controller or an IPM machine system.

The electronic data processing system 120 includes electronic modules, software modules, or both. In an example embodiment, the electronic data processing system 120 includes a processor and a memory to support storing, processing and execution of software instructions of one or more software modules. The electronic data processing system 120 is indicated by the dashed lines in FIG. 1 and is shown in greater detail in FIG. 2.

In an example embodiment, a torque command generation module 105 is coupled to a d-q axis current generation manager 109 (e.g., d-q axis current generation look-up tables). The d-q axis current refers to the direct axis current and the quadrature axis current as applicable in the context of vector-controlled alternating current machines, such as the motor 117. The output of the d-q axis current generation manager 109 (d-q axis current commands iq_cmd and id_cmd) and the output of a current adjustment module 107

(e.g., d-q axis current adjustment module 107) are fed to a summer 119. In turn, one or more outputs (e.g., direct axis current data (id*) and quadrature axis current data (iq*)) of the summer 119 are provided or coupled to a current regulation controller 111. While the term current command is used, it should be understood that current command refers to a target current value.

The current regulation controller 111 is capable of communicating with the pulse-width modulation (PWM) generation module 112 (e.g., space vector PWM generation module). The current regulation controller 111 receives respective adjusted d-q axis current commands (e.g., id* and iq*) and actual d-q axis currents (e.g., id and iq) and outputs corresponding d-q axis voltage commands (e.g., vd* and vq* commands) for input to the PWM generation module 112.

In an example embodiment, the PWM generation module 112 converts the direct axis voltage and quadrature axis voltage data from two phase data representations into three phase representations (e.g., three phase voltage representations, such as va*, vb* and vc*) for control of the motor 117. va*, vb* and vc* may be referred to as inverter terminal voltages. Outputs of the PWM generation module 112 are coupled to an inverter circuit 188. The output stage of the inverter circuit 188 (e.g., output terminal voltages va, vb and vc) provides a pulse-width modulated voltage waveform or other voltage signal for control of the motor 117. In an example embodiment, the inverter circuit 188 is powered by a direct current (dc) voltage bus.

In one example embodiment, the inverter switching circuit 188 includes two or more inverters, each of which is a semiconductor drive circuit that drives or controls switching semiconductors (e.g., insulated gate bipolar transistors (IGBT) or other power transistors, including but not limited to, a metal-oxide Semiconductor Field-Effect Transistor (MOSFET), a Silicon Carbide MOSFET or a Silicon Carbide IGBT) to output control signals for the motor 117. In turn, the inverter circuit 188 is coupled to the motor 117. The inverter switching circuit will be further described with respect to FIGS. 3A-7.

The motor 117 is associated with a sensor 115 (e.g., a position sensor, a resolver or encoder position sensor) that is associated with the motor shaft 126 or the rotor. The sensor 115 and the motor 117 are coupled to the electronic data processing system 120 to provide feedback data (e.g., current feedback data, such as phase current values ia, ib and ic), raw position signals, among other possible feedback data or signals, for example. Other possible feedback data includes, but is not limited to, winding temperature readings, semiconductor temperature readings of the inverter circuit 188, three phase voltage data, or other thermal or performance information for the motor 117.

The motor 117 is associated with the sensor 115 (e.g., a resolver, encoder, speed sensor, or another position sensor or speed sensors) that estimates at least one of an angular position of the motor shaft 126, a speed or velocity of the motor shaft 126, and a direction of rotation of the motor shaft 126. The sensor 115 may be mounted on or integral with the motor shaft 126. The output of the sensor 115 is capable of communication with the primary processing module 114 (e.g., position and speed processing module). In an example embodiment, the sensor 115 may be coupled to an analog-to-digital converter (not shown) that converts analog raw position data or velocity data to digital raw position or velocity data, respectively. In other example embodiments, the sensor 115 (e.g., digital position encoder) may provide a digital data output of raw position data or velocity data for the motor shaft 126 or rotor.

A first output (e.g., position data θ for the motor 117) of the primary processing module 114 is communicated to the phase converter 113 (e.g., three-phase to two-phase current Park transformation module) that converts respective three-phase digital representations of measured current into corresponding two-phase digital representations of measured current. A second output (e.g., speed data SD for the motor 117) of the primary processing module 114 is communicated to the calculation module 110 (e.g., adjusted voltage over speed ratio module).

An input of a sensing circuit 124 is coupled to terminals of the motor 117 for sensing at least the measured three-phase currents and a voltage level of the direct current (dc) bus (e.g., high voltage dc bus which may provide dc power to the inverter circuit 188). An output of the sensing circuit 124 is coupled to an analog-to-digital converter 122 for digitizing the output of the sensing circuit 124. In turn, the digital output of the analog-to-digital converter 122 is coupled to the secondary processing module 116 (e.g., dc bus voltage and three phase current processing module). For example, the sensing circuit 124 is associated with the motor 117 for measuring three phase currents (e.g., current applied to the windings of the motor 117, back EMF (electromotive force) induced into the windings, or both).

Certain outputs of the primary processing module 114 and the secondary processing module 116 feed the phase converter 113. For example, the phase converter 113 may apply a Park transformation or other conversion equations (e.g., certain conversion equations that are suitable are known to those of ordinary skill in the art) to convert the measured three-phase representations of current into two-phase representations of current based on the digital three-phase current data ia, ib and ic from the secondary processing module 116 and position data θ from the sensor 115. The output of the phase converter 113 module (id, iq) is coupled to the current regulation controller 111.

Other outputs of the primary processing module 114 and the secondary processing module 116 may be coupled to inputs of the calculation module 110 (e.g., adjusted voltage over-speed ratio calculation module). For example, the primary processing module 114 may provide the speed data SD (e.g., motor shaft 126 speed in revolutions per minute), whereas the secondary processing module 116 may provide a measured (detected) level of the operating dc bus voltage Vdc of the motor 117 (e.g., on the dc bus of a vehicle). The dc voltage level on the dc bus that supplies the inverter circuit 188 with electrical energy may fluctuate or vary because of various factors, including, but not limited to, ambient temperature, temperature of power electronic devices, damage suffered by power electronic devices even during and/or within the design life cycle of power electronic inverter, battery condition, battery charge state, battery resistance or reactance, fuel cell state (if applicable), motor load conditions, respective motor torque and corresponding operational speed, and vehicle electrical loads (e.g., electrically driven air-conditioning compressor). The calculation module 110 is connected as an intermediary between the secondary processing module 116 and the d-q axis current generation manager 109. The output of the calculation module 110 can adjust or impact the current commands iq_cmd and id_cmd generated by the d-q axis current generation manager 109 to compensate for fluctuation or variation in the dc bus voltage, among other things.

The rotor magnet temperature estimation module 104, the current shaping module 106, and the terminal voltage feedback module 108 are coupled to or are capable of communicating with the d-q axis current adjustment module 107. In turn, the d-q axis current adjustment module 107 may communicate with the d-q axis current generation manager or the summer 119.

The rotor magnet temperature estimation module 104 estimates or determines the temperature of the rotor permanent magnet or magnets. In an example embodiment, the rotor magnet temperature estimation module 104 may estimate the temperature of the rotor magnets from, one or more sensors located on the stator, in thermal communication with the stator, or secured to the housing of the motor 117.

In another example embodiment, the rotor magnet temperature estimation module 104 may be replaced with a temperature detector (e.g., a thermistor and wireless transmitter like infrared thermal sensor) mounted on the rotor or the magnet, where the detector provides a signal (e.g., wireless signal) indicative of the temperature of the magnet or magnets.

In another example embodiment, the rotor magnet temperature estimation module 104 may be replaced with a back electromotive force (EMF) sensed at the known speed of the Permanent Magnet motor and indirectly estimated to indicate the temperature of the magnet or magnets.

In an example embodiment, the system may operate in the following manner. The torque command generation module 105 receives an input control data message, such as a speed control data message, a voltage control data message, or a torque control data message, over a vehicle data bus 118. The torque command generation module 105 converts the received input control message into torque control command data T_cmd.

The d-q axis current generation manager 109 selects or determines the direct axis current command and the quadrature axis current command associated with respective torque control command data and respective detected motor shaft 126 speed data SD. For example, the d-q axis current generation manager 109 selects or determines the direct axis current command and the quadrature axis current command by accessing one or more of the following: (1) a look-up table, database or other data structure that relates respective torque commands to corresponding direct and quadrature axes currents, (2) a set of quadratic equations or linear equations that relate respective torque commands to corresponding direct and quadrature axes currents, or (3) a set of rules (e.g., if-then rules) that relates respective torque commands to corresponding direct and quadrature axes currents. The sensor 115 on the motor 117 facilitates provision of the detected speed data SD for the motor shaft 126, where the primary processing module 114 may convert raw position data provided by the sensor 115 into speed data SD.

The current adjustment module 107 (e.g., d-q axis current adjustment module) provides current adjustment data to adjust the direct axis current command id_cmd and the quadrature axis current command iq_cmd based on input data from the rotor magnet temperature estimation module 104, the current shaping module 106, and terminal voltage feedback module 108.

The current shaping module 106 may determine a correction or preliminary adjustment of the quadrature axis (q-axis) current command and the direct axis (d-axis) current command based on one or more of the following factors: torque load on the motor 117 and speed of the motor 117, for example. The rotor magnet temperature estimation module 104 may generate a secondary adjustment of the q-axis current command and the d-axis current command based on an estimated change in rotor temperature, for example. The terminal voltage feedback module 108 may provide a third adjustment to d-axis and q-axis current based on controller voltage command versus voltage limit. The current adjustment module 107 may provide an aggregate current adjustment that considers one or more of the following adjustments: a preliminary adjustment, a secondary adjustment, and a third adjustment.

The terminal voltage feedback module 108 may further provide an additional feedback for adjustment to d-axis and q-axis current based on a terminal voltage threshold and estimates of the actual terminal voltages Va, Vb and Vc provided by an estimation and threshold module 127, as will be described below. The estimation and threshold module 127 may further be coupled to outputs of the PWM generation module 112, which may provide the estimation and threshold module 127 with the inverter terminal voltages (va*, vb* and vc*). The estimation and threshold module 127 may estimate actual terminal voltages Va, Vb and Vc of the inverter circuit 188 such that the inverter terminal voltages (Va*, Vb* and Vc*) accurately resemble the actual output terminal voltages (Va, Vb and Vc. The estimation and threshold module 127 may further provide terminal voltage threshold.

In an example embodiment, the motor 117 may include an interior permanent magnet (IPM) machine or a synchronous IPM machine (IPMSM).

The sensor 115 (e.g., shaft or rotor speed detector) may include one or more of the following: a direct current motor, an optical encoder, a magnetic field sensor (e.g., Hall Effect sensor), magneto-resistive sensor, and a resolver (e.g., a brushless resolver). In one configuration, the sensor 115 includes a position sensor, where raw position data and associated time data are processed to determine speed or velocity data for the motor shaft 126. In another configuration, the sensor 115 includes a speed sensor, or the combination of a speed sensor and an integrator to determine the position of the motor shaft.

In yet another example embodiment, the sensor 115 includes an auxiliary, compact direct current generator that is coupled mechanically to the motor shaft 126 of the motor 117 to determine speed of the motor shaft 126, where the direct current generator produces an output voltage proportional to the rotational speed of the motor shaft 126. In still another configuration, the sensor 115 includes an optical encoder with an optical source that transmits a signal toward a rotating object coupled to the motor shaft 126 and receives a reflected or diffracted signal at an optical detector, where the frequency of received signal pulses (e.g., square waves) may be proportional to a speed of the motor shaft 126. In an additional configuration, the sensor 115 includes a resolver with a first winding and a second winding, where the first winding is fed with an alternating current, where the voltage induced in the second winding varies with the frequency of rotation of the rotor.

Figure 2:
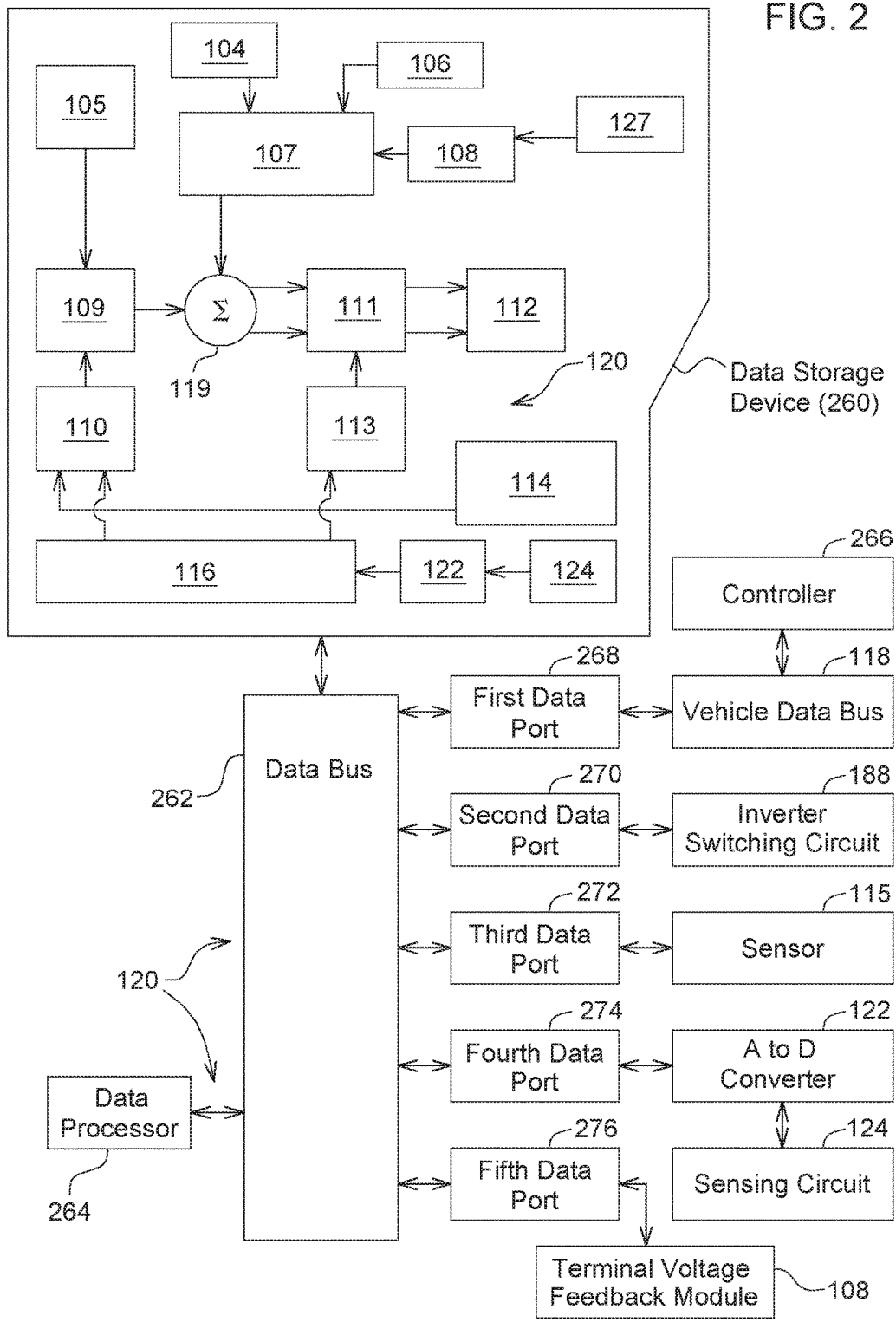

FIG. 2 is a block diagram of an electronic data processing system consistent with FIG. 1, according to an example embodiment. In FIG. 2, the electronic data processing system 120 includes an electronic data processor 264, a data bus 262, a data storage device 260, and one or more data ports (268, 270, 272, 274 and 276). The data processor 264, the data storage device 260 and one or more data ports are coupled to the data bus 262 to support communications of data between or among the data processor 264, the data storage device 260 and one or more data ports.

In an example embodiment, the data processor 264 may include an electronic data processor, a microprocessor, a microcontroller, a programmable logic array, a logic circuit, an arithmetic logic unit, an application specific integrated circuit, a digital signal processor, a proportional-integral-derivative (PID) controller, or another data processing device.

The data storage device 260 may include any magnetic, electronic, or optical device for storing data. For example, the data storage device 260 may include an electronic data storage device, an electronic memory, non-volatile electronic random access memory, one or more electronic data registers, data latches, a magnetic disc drive, a hard disc drive, an optical disc drive, or the like.

As shown in FIG. 2, the data ports include a first data port 268, a second data port 270, a third data port 272, a fourth data port 274 and a fifth data port 276. While in FIG. 2, 5 data ports are shown, any suitable number of data ports may be used. Each data port may include a transceiver and buffer memory, for example. In an example embodiment, each data port may include any serial or parallel input/output port.

In an example embodiment as illustrated in FIG. 2, the first data port 268 is coupled to the vehicle data bus 118. In turn, the vehicle data bus 118 is coupled to a controller 266. In one configuration, the second data port 270 may be coupled to the inverter circuit 188; the third data port 272 may be coupled to the sensor 115; the fourth data port 274 may be coupled to the analog-to-digital converter 122; and the fifth data port 276 may be coupled to the terminal voltage feedback module 108. The analog-to-digital converter 122 is coupled to the sensing circuit 124.

In an example embodiment of the data processing system 120, the torque command generation module 105 is associated with or supported by the first data port 268 of the electronic data processing system 120. The first data port 268 may be coupled to a vehicle data bus 118, such as a controller area network (CAN) data bus. The vehicle data bus 118 may provide data bus messages with torque commands to the torque command generation module 105 via the first data port 268. The operator of a vehicle may generate the torque commands via a user interface, such as a throttle, a pedal, the controller 266, or other control devices.

In one example embodiment, the PWM generation module 112 may communicate with the inverter switching circuit 188 and/or the data processor 264 via the second data port 270. In some example embodiments, the sensor 115 may communicate with the primary processing module 114 and/or the data processor 264 via the third data port 272. In one example embodiment, the analog-to-digital converter 122 may communicate with the sensing circuit 124 and/or the data processor 264 via the fourth data port 274. In one example embodiment, the terminal voltage feedback module 108 may communicate with the data processor 264 via the fifth data port 276.

Figure 3A:
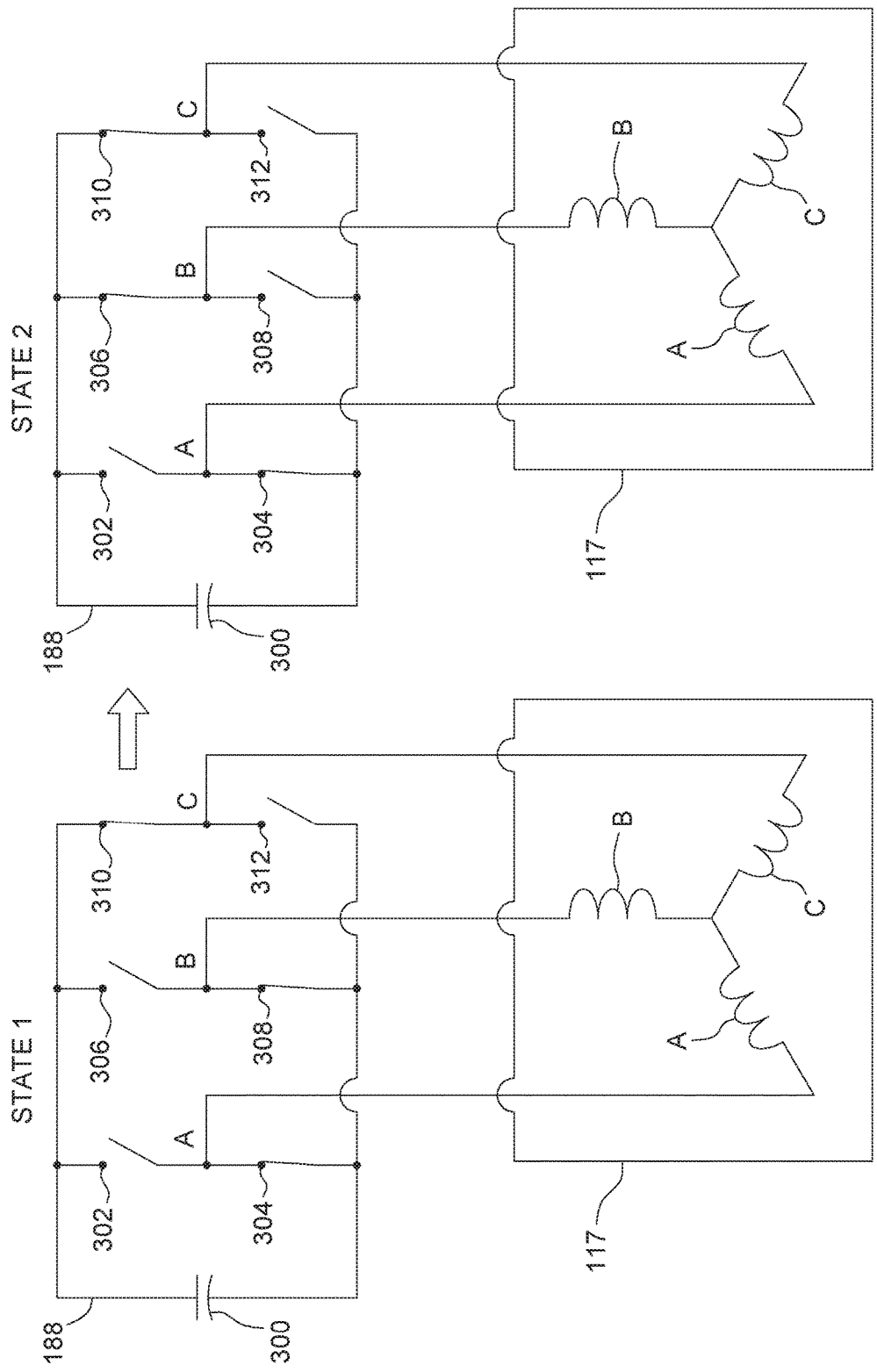
FIG. 3A illustrates a conventional single inverter switching circuit operating in two different states.

FIG. 3A illustrates a conventional single inverter switching circuit operating in two different states. As shown in FIG. 3A, the inverter switching circuit 188 includes a DC power supply 300, switching semiconductors 302, 304, 306, 308, 310 and 312. The inverter switching circuit 188 is coupled to the three-phase load 117. The load 117 and motor 117 may be used interchangeably.

The switching semiconductors 302, 304, 306, 308, 310 and 312 are IGBTs. IGBTs 302 and 304 form one of the three phases (Phases A, B and C) of the three-phase inverter switching circuit 188 (e.g., phase A). For phase A, either the IGBT 302 provides a logic-high voltage to the corresponding phase A of the three-phase load 117 or the IGBT 304 provides a logic-low voltage to the corresponding phase A of the three-phase load 117. Similarly IGBTs 306 and 308 form another one of the three phases of the three-phase inverter switching circuit 188 (e.g., phase B). For phase B, either the IGBT 306 provides a logic-high voltage to the corresponding phase B of the three-phase load 117 or the IGBT 308 provides a logic-low voltage to the corresponding phase B of the three-phase load 117. Similarly IGBTs 310 and 312 form another one of the three phases of the three-phase inverter switching circuit 188 (e.g., phase C). For phase C, either the IGBT 310 provides a logic-high voltage to the corresponding phase C of the three-phase load 117 or the IGBT 312 provides a logic-low voltage to the corresponding phase C of the three-phase load 117.

FIG. 3A illustrates the inverter switching circuit 188 in two different switching states 1 and 2. The operating status of each phase of the inverter switching circuit 188 in each of the states 1 and 2 are shown in FIG. 3B.

FIG. 3B is a state diagram illustrating two different states of the single inverter switching circuit of FIG. 3A.

As shown in FIG. 3B, graph 320 shows that in both states 1 and 2, the phase A of the inverter switching circuit 188 is at logic-low voltage, which is supported by the fact that between the IGBTs 302 and 304 that form phase A of the inverter switching circuit 188, the IGBT 302 is closed (i.e., is ON) in both states 1 and 2. Furthermore, graph 320 shows that in states 1 and 2, the phase B of the inverter switching circuit 188 is at logic-low voltage in state 1 while switching to logic-high in state 2. This is supported by the fact that between the IGBTs 306 and 308 that form phase B, the IGBT 308 is closed (i.e., is ON) in state 1 and the IGBT 306 is closed in state 2. Moreover, graph 320 shows that in both states 1 and 2, the phase C of the inverter switching circuit 188 is at logic-high voltage, which is supported by the fact that between the IGBTs 310 and 312 that form phase U, the IGBT 310 is closed (i.e., is ON) in both states 1 and 2.

The single inverter switching circuit 188, as shown in FIG. 3A suffers from the one or more of the deficiencies described above in the Background section (e.g., not being large enough to handle the required current, etc.) Furthermore, simply configuring two single inverters such as that shown in FIG. 3A in a parallel fashion to form a parallel current sharing scheme, suffers from one or more of the deficiencies described above in the Background section (e.g., overheating, etc.). Hereinafter, example embodiments of a parallel inverter scheme that addresses said deficiencies will be described.

Figure 4A:
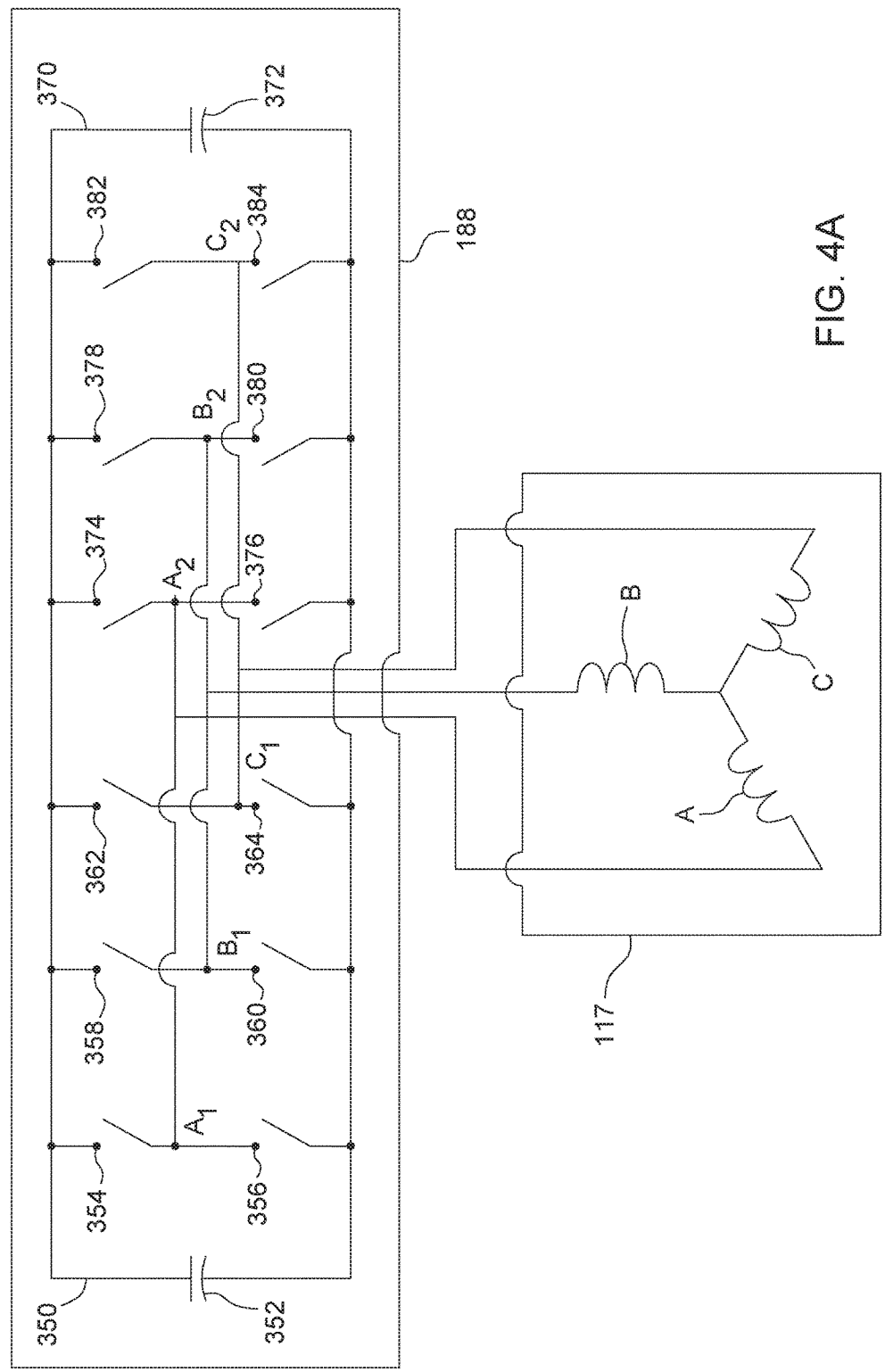
FIG. 4A illustrates an inverter switching circuit of FIG. 1, according to an example embodiment.

FIG. 4A illustrates an inverter switching circuit of FIG. 1, according to an example embodiment. As shown in FIG. 4A, the inverter switching circuit 188 of FIG. 1 is made of two inverter circuits 350 and 370 coupled to the load 117. In one example embodiment the load 117 is the same as the three-phase load 117, described above with reference to FIG. 3A.

In one example embodiment, the connection between the inverter circuits 350 and 370 may be referred to as a parallel inverter scheme. In one example embodiment, the structure of each of the inverter circuits 350 and 370 is the same as that of the single inverter described above with reference to FIG. 3A.

In one example embodiment, the inverter circuit 350 includes a DC power supply 352, switching semiconductors 354, 356, 358, 360, 362 and 364. The inverter circuit 350 is coupled to the three-phase load 117, as will be described below.

In one example embodiment, the DC power supply 352 is any known or to be developed DC power supply, including but not limited to, a capacitor bank having sufficient charge stored for charging the inverter switching circuit 188, a battery pack, or any other means for storing energy in DC form.

The switching semiconductors 354, 356, 358, 360, 362 and 364 are IGBTs, in one example embodiment. However, example embodiments are not limited to IGBTs and that the switching semiconductors of the inverter circuit 350 may be any other known or to be developed power switches (e.g., one of Metal-Oxide-Semiconductor Field Effect Transistors (MOSFETs), Injection Enhanced Gate Transistors (IEGTs), Bipolar Junction Transistors (BJT's), Thyristors, Gate Turn Off Thyristors (GTOs)). In one example embodiment, IGBTs 354 and 356 form one of the three phases of the inverter circuit 350 (e.g., phase A1). For phase A1, either the IGBT 354 provides a logic-high voltage to the corresponding terminal of the three-phase load 117 or the IGBT 356 provides a logic-low voltage to the corresponding terminal of the three-phase load 117. Similarly IGBTs 358 and 360 form another one of the three phases of the inverter circuit 350 (e.g., phase B1). For phase B1, either the IGBT 358 provides a logic-high voltage to the corresponding terminal of the three-phase load 117 or the IGBT 360 provides a logic-low voltage to the corresponding terminal of the three-phase load 117. Similarly IGBTs 362 and 364 form another one of the three phases of the inverter circuit 350 (e.g., phase C1). For phase C1, either the IGBT 362 provides a logic-high voltage to the corresponding terminal of the three-phase load 117 or the IGBT 364 provides a logic-low voltage to the corresponding terminal of the three-phase load 117.

In one example embodiment, the inverter circuit 370 includes a DC power supply 372, switching semiconductors 374, 376, 378, 380, 382 and 384. The inverter circuit 370 is coupled to the three-phase load 117, as will be described below.

In one example embodiment, the DC power supply 372 is any known or to be developed DC power supply, including but not limited to, a capacitor bank having sufficient charge stored for charging the inverter switching circuit 188, a battery pack, or any other means for storing energy in DC form.

The switching semiconductors 374, 376, 378, 380, 382 and 384 are IGBTs, in one example embodiment. However, example embodiments are not limited to IGBTs and that the switching semiconductors of the inverter 350 may be any other known or to be developed power switches (e.g., one of Metal-Oxide-Semiconductor Field Effect Transistors (MOSFETs), Injection Enhanced Gate Transistors (IEGTs), Bipolar Junction Transistors (BJT's), Thyristors, Gate Turn Off Thyristors (GTOs)). In one example embodiment, IGBTs 374 and 376 form one of the three phases of the inverter circuit 370 (e.g., phase A2). For phase A2, either the IGBT 374 provides a logic-high voltage to the corresponding terminal of the three-phase load 117 or the IGBT 376 provides a logic-low voltage to the corresponding terminal of the three-phase load 117. Similarly IGBTs 378 and 380 form another one of the three phases of the inverter circuit 370 (e.g., phase B2). For phase B2, either the IGBT 378 provides a logic-high voltage to the corresponding terminal of the three-phase load 117 or the IGBT 380 provides a logic-low voltage to the corresponding terminal of the three-phase load 117. Similarly IGBTs 382 and 384 form another one of the three phases of the inverter circuit 188 (e.g., phase C2). For phase C2, either the IGBT 382 provides a logic-high voltage to the corresponding terminal of the three-phase load 117 or the IGBT 384 provides a logic-low voltage to the corresponding terminal of the three-phase load 117.

As shown in FIG. 4A and in one example embodiment, phase A1 of the inverter circuit 350 and phase A2 of the inverter circuit 370 are connected to one another and further coupled to phase A of the load 117. Similarly, phase B1 of the inverter circuit 350 and phase B2 of the inverter circuit 370 are connected to one another and further coupled to phase B of the load 117. Finally, phase C1 of the inverter circuit 350 and phase C2 of the inverter circuit 370 are connected to one another and further coupled to phase C of the load 117.

While the inverter switching circuit 188 is shown as having two inverter circuits 350 and 370, example embodiments are not limited thereto. Alternatively, the inverter switching circuit 188 may include three or more inverter switching circuits such as circuits 350 and 370.

While an example configuration of the structures of inverter circuits 350 and 370 have been described with reference to FIG. 4A, example embodiments are not limited thereto. The inverter circuits 350 and 370 may be any known or to be developed inverter circuit to be utilized in driving/power electric motors such as motor (load) 117.

Figure 4B:
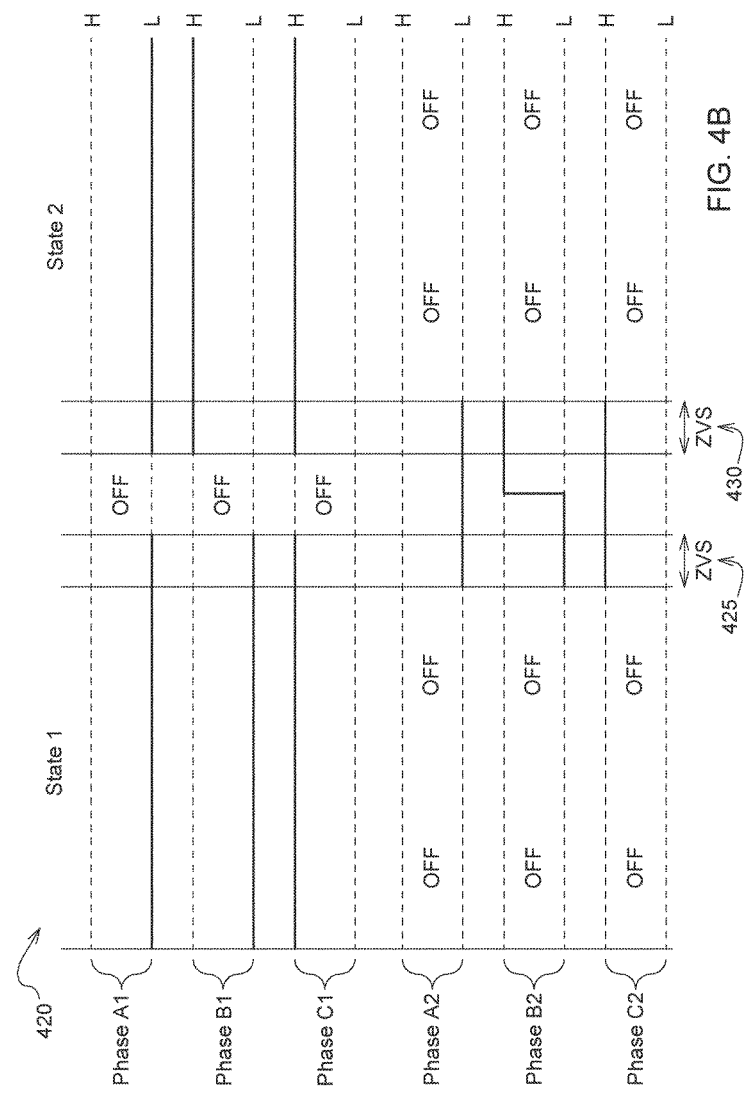
FIG. 4B is a state diagram illustrating two different states of a parallel inverter scheme of FIG. 4A, according to an example embodiment.

FIG. 4B is a state diagram illustrating two different states of a parallel inverter scheme of FIG. 4A, according to an example embodiment. With reference to FIGS. 4A and 4B, the control signals for controlling the operation of the inverter circuits 350 and 370 may be provided by the electronic data processing system 120 (e.g., via the PWM generation module 112) to the gate terminal of respective switches in each of the inverter circuits 350 and 370.

As shown in FIG. 4B, graph 420 shows that in state 1 the inverter circuit 350 is turned on and thus conducts current by providing high or low voltages via phases A1, B1 and C1. In one example embodiment shown in FIG. 4B, in State 1, A1 is at a low voltage (i.e., the switch 354 is open while the switch 356 is closed), B1 is at a low voltage (i.e., the switch 358 is open while the switch 360 is closed), and C1 is at a high voltage (i.e., the switch 362 is closed while the switch 364 is open). Furthermore, in State 1, the inverter circuit 370 is completely turned off (no voltage is applied to the gates of the switches of the inverter circuit 370 in order to turn the switches on) such that no voltage for driving the load 117 is provided via A2, B2 and C2.

In one example embodiment, prior to switching from State 1 to State 2, the inverter circuit 370 is turned on, in state 1, such that for a short period of time, the inverter circuit 350 and the inverter circuit 370 are simultaneously turned on and operating in state 1 (this may be referred to as a zero voltage switching (ZVS) period 425 shown in FIG. 4B, in which both inverter circuits 350 and 370 share the current to be supplied to the load 117, which may be referred to as current sharing).

Thereafter, the inverter circuit 350 is turned off while the inverter circuit 370 performs the switching. In one example embodiment, during this period, the inverter circuit 370 conducts 100% of the current. According to the example State 1, only B2 switches from low to high while A2 and C2 remain unchanged. Accordingly, the electronic data processing system 120 provides commands to the inverter circuit 370 such that A2 remains at a low voltage (i.e., switch 376 is closed while switch 374 is open), B2 switches to a high voltage (i.e., switch 378 is closed while switch 380 is open), and C2 remains at a high voltage (switch 382 is open while switch 384 is closed).

Upon switching states and before turning the inverter circuit 370 off, the electronic data processing system 120 turns the inverter circuit 350 on according to state 2, such that both inverter circuits 350 and 370 are turned on in another ZVS period 430. Thereafter, the electronic data processing system 120 turns the inverter circuit 370 off while keeping the inverter circuit 350 on in State 2, where the inverter circuit 350 is now conducting 100% of the current.

In one example embodiment, the electronic data processing system 120 sends a command, to turn on or off, only the phase for which the state changes from State 1 to State 2 (e.g., phase B1 described above). This will be further described with reference to FIG. 4C.

Figure 4C:
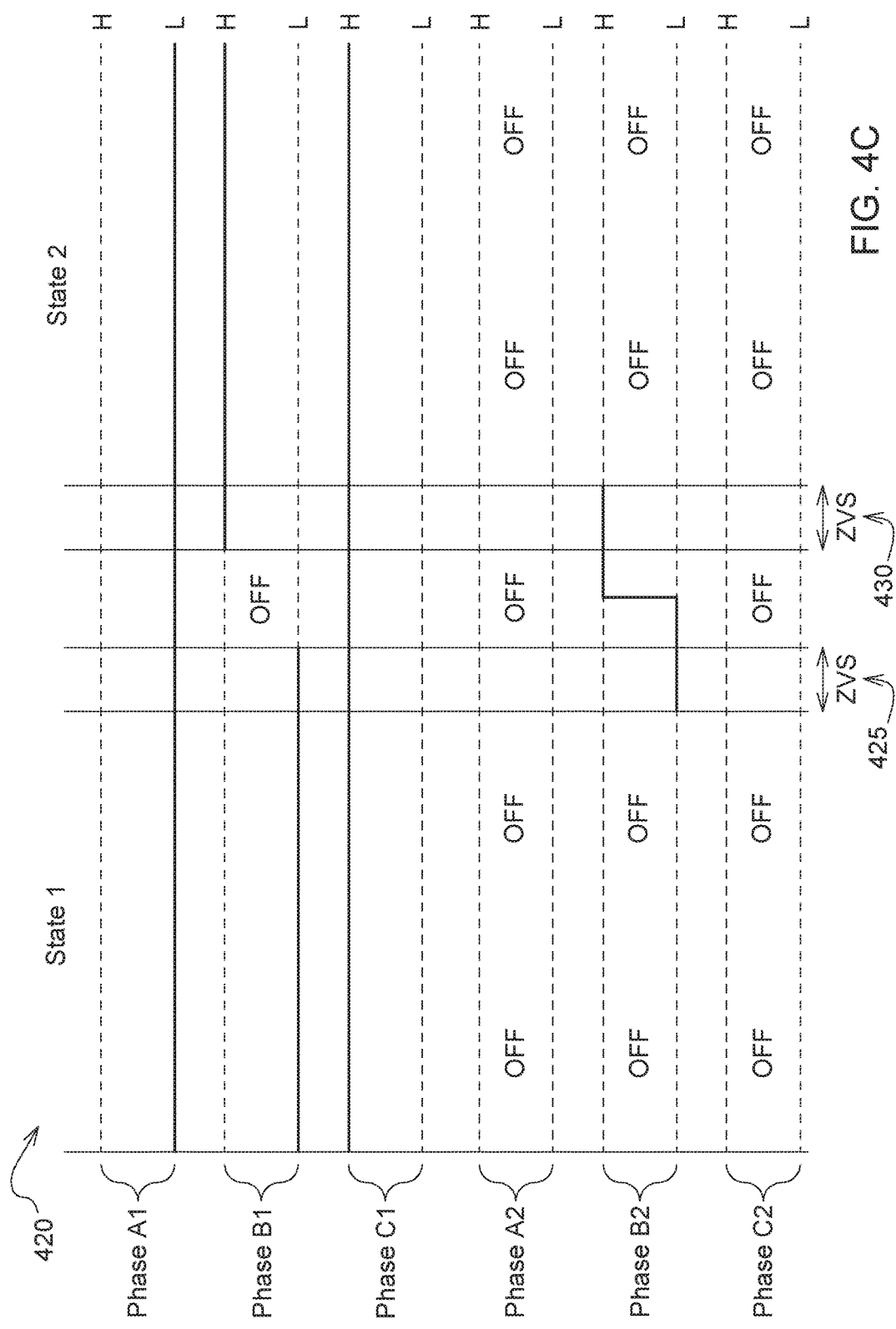
FIG. 4C is a state diagram illustrating another two different states of a parallel inverter scheme of FIG. 4A, according to an example embodiment

FIG. 4C is a state diagram illustrating another two different states of a parallel inverter scheme of FIG. 4A, according to an example embodiment.

As shown in FIG. 4C, between states 1 and 2, phases A1 and C1 of the inverter circuit 350 remain the same (e.g., A1 is at low level in states 1 and 2 and C1 is at high level in states 1 and 2). However, phase B1 changes from low level in state 1 to high level in state 2. Accordingly, the electronic data processing system 120 does not provide commands to phases A1 and C1 of the inverter circuit 350 to be turned off between the ZVS periods 425 and 430 but only provides a command to phase B1 to be turned off between the ZVS periods 425 and 430. In other words, phases A1 and C1 remain at low and high levels, respectively, at all times (in State 1, in ZVS 425, during the period in which the inverter circuit 370 is conducting between ZVS periods 425 and 430, in the ZVS period 430 and in State 2).

Similarly, for the inverter circuit 370, between the ZVS periods 425 and 430, the electronic data processing system 120 only provides a command to turn phase B2 on (in order to switch B2 from low to high) but does not provide a command to phases A2 and/or C2.

Accordingly, the configuration of the parallel inverter scheme of the inverter switching circuit 188, as shown in FIG. 4A, and controlled by the control commands provided by the electronic data processing system 120, as shown in FIG. 4B, allows for one inverter circuit (e.g., inverter circuit 370) to perform the switching while allowing the other inverter circuit (inverter circuit 350) to perform conduction of the current. Accordingly, switching losses will be isolated to the inverter circuit (e.g., inverter circuit 370) that performs the switching while the conduction losses will be isolated to the inverter circuit (e.g., the inverter circuit 350) that performs the conduction. In the example embodiment shown in FIGS. 4A and 4B, the inverter circuit 350 performs the conduction while the inverter circuit 370 performs the switching. Accordingly, the inverter circuit 350 may be referred to as the conducting inverter and the inverter circuit 370 may be referred to as the switching inverter.

Figure 5:
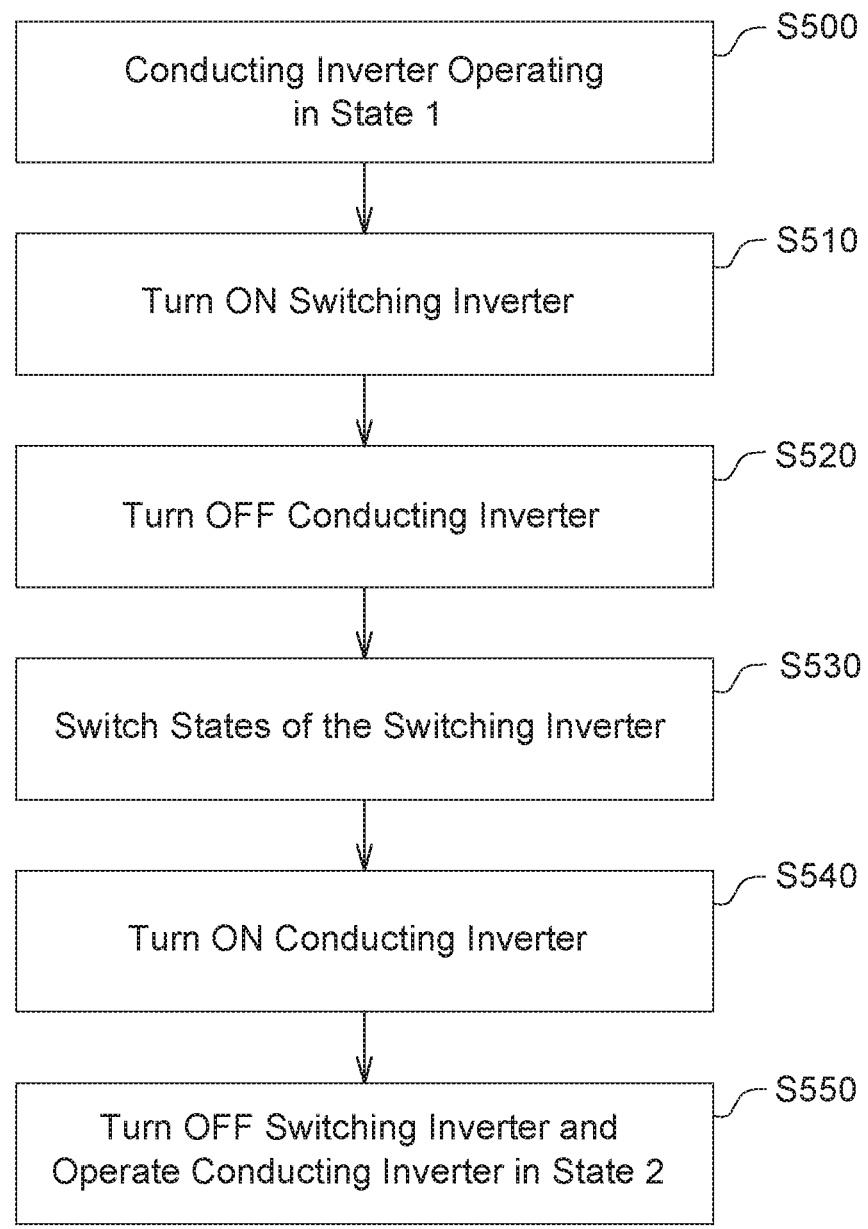

FIG. 5 illustrates a method of driving a parallel inverter scheme, as shown in FIGS. 4A and 4B, according to an example embodiment.

At S500, the electronic data processing system 120 turns on the conducting inverter and operate the conducting inverter in state 1 (e.g., the inverter circuit 350), while keeping the switching inverter (e.g., the inverter circuit 370) off. In other words, the initial condition is that the inverter circuit 350 operates in state 1 (State 1 described above with reference to FIGS. 4A and 4B are example states. However, example embodiments are not limited to the specific State 1 described above). The electronic data processing system 120 may turn on the conducting inverter (e.g., the inverter circuit 350) by sending command signals to gate terminals of one of the switches of each phase of the inverter circuit 350, according to State 1 and not sending any command signals to the switching inverter (e.g., the inverter circuit 370), as described above.

At S510, the electronic data processing system 120 turns on the switching inverter (e.g., the inverter circuit 370) according to State 1, such that the switching inverter (e.g., the inverter circuit 370) and the conducting inverter (e.g., the inverter circuit 350) simultaneously conduct thus sharing current, inverter circuit 370 having turned on in the ZVS period 425. In one example embodiment, a period during which the switching inverter (e.g., the inverter circuit 370) and the conducting inverter (e.g., the inverter circuit 35) are simultaneously operating at S510, is short and transitory (e.g., corresponding to the time required for ZVS (e.g., on the order of 1 µs (microsecond))).

Thereafter, at S520, the electronic data processing system 120 turns off the conducting inverter (e.g., the inverter circuit 350) such that the switching inverter (e.g., the inverter circuit 370) conducts full (100%) of the current.

Upon turning off the conducting inverter (e.g., the inverter circuit 350) and while the switching inverter (e.g., the inverter circuit 370) is conducting full current, at S530, the electronic data processing system 120 switches the switching inverter (e.g., the inverter circuit 370) from operating in State 1 to operating in State 2 by providing commands to the gate of one of the switches corresponding to each phase (A2, B2 and C2) of the switching inverter, according to State 2.

Thereafter and at S540, the electronic data processing system 120 turns on the conducting inverter (e.g., the inverter circuit 350) using ZVS in State 2 such that the conducting inverter (e.g., the inverter circuit 350) and the switching inverter (e.g., the inverter circuit 370) operate simultaneously in the period 430 thus sharing current. In one example embodiment, a period during which the switching inverter (e.g., the inverter circuit 370) and the conducting inverter (e.g., the inverter circuit 35) are simultaneously operating at S540, is short and transitory (e.g., corresponding to the time required for ZVS (e.g., on the order of 1 µs (microsecond))).

At S550, the electronic data processing system 120 turns off the switching inverter (e.g., the inverter circuit 370) using ZVS and operates the conducting inverter (e.g., the inverter circuit 350) in State 2, thereafter.

While example embodiments described with reference to FIGS. 4A, 4B and 5, illustrate two inverter circuits 350 and 370 forming the parallel inverter scheme of the inverter switching circuit 188, example embodiments are not limited thereto. The inverter switching circuit 188 may include any number of conducting and switching inverters (greater than or equal to two inverters) such as inverter circuits 350 and 370. Furthermore, the number of switching inverters and the conducting inverters in such parallel inverter schemes may be different. However, such parallel inverter scheme includes at least one of each type of inverter (i.e., at least one switching inverter and at least one conducting inverter).

Accordingly, for the inverter switching circuit 188 utilizing a parallel inverter scheme with more than two inverters (switching and conducting inverters), the parallel scheme may operate as follows.

In state 1, a first conducting inverter CI1 (such as the inverter circuit 350) conducts full current. Prior to performing the switching by a first switching circuit SC1 from State 1 to State 2 (such as the inverter circuit 370), CI1 and SC1 share the current. Thereafter CI1 is turned off while SC1 conducts full current and performs the switching to State 2. Now, in contrast to the case of only two inverter circuits as described above with reference to FIGS. 4A and 4B, instead of turning the CI1 back on again, a second conducting inverter CI2 is turned on according to State 2 before SC1 is turned off and thus CI2 and SC1 share current. Thereafter, SC1 is turned off and CI2 conducts full current according to State 2.

With respect to any further change from state 2 to any other state (e.g., back to State 1 or any other state), the above-described process is repeated using CI2, SC2 and CI3. This process is repeated in a similar fashion for any subsequent change of State of the inverter switching circuit 188 until all the switching and conducting inverters of the inverter switching circuit 188 are covered. Thereafter, the process reverts back to CI1 and SC1.

In other words, assuming that the parallel inverter scheme of the inverter switching circuit 188 utilizes N conducting inverters and M switching inverters (M and N may be any positive integer greater than or equal to 1 and that M and N may be the same or different), each of the N conducting inverters conducts 1/N of the time while each one of the M switching inverters switches 1/M of the time.

In one example embodiment and as is known in the art, operation of the inverter switching circuit 188 in a given state and/or switching thereof from one state to another, may be dictated by torque requirements and feedback obtained from the inverter switching circuit 188.

The description provided above with reference to FIGS. 4A, 4B, and 5 illustrate the controlling of the parallel inverter scheme of the inverter switching circuit 188 using state (e.g., State 1 or 2 described above) specific control signals provided by the electronic data processing system 120 to the inverter circuits 350 and 270. However, as an alternative to the electronic data processing system 120 providing state specific control signals, as described above, in an example embodiment, a voltage command generator (in the form of a circuit, as will be described below with reference to FIG. 6) is utilized at a point between the PWM generation module 112 of the electronic data processing system 120 and the inverter switching circuit 188 shown in FIG. 1A. In one example embodiment, the voltage command generator receives the three phase control commands (Va*, Vb* and Vc*) from the PWM generation module 112 of the electronic data processing system 120 (notations a, b and c are consistent with the notation used for designating phase A, Phase B and Phase C, throughout the present disclosure) and converts each of the three phase control commands to the respective A1/A2, B1/B2, and C1/C2, described above for driving the parallel inverter scheme of the inverter switching circuit 188.

In one example embodiment, a separate voltage command generator may be used for each of the three phase control commands provided by the PWM generation module 112.

Figure 6A:
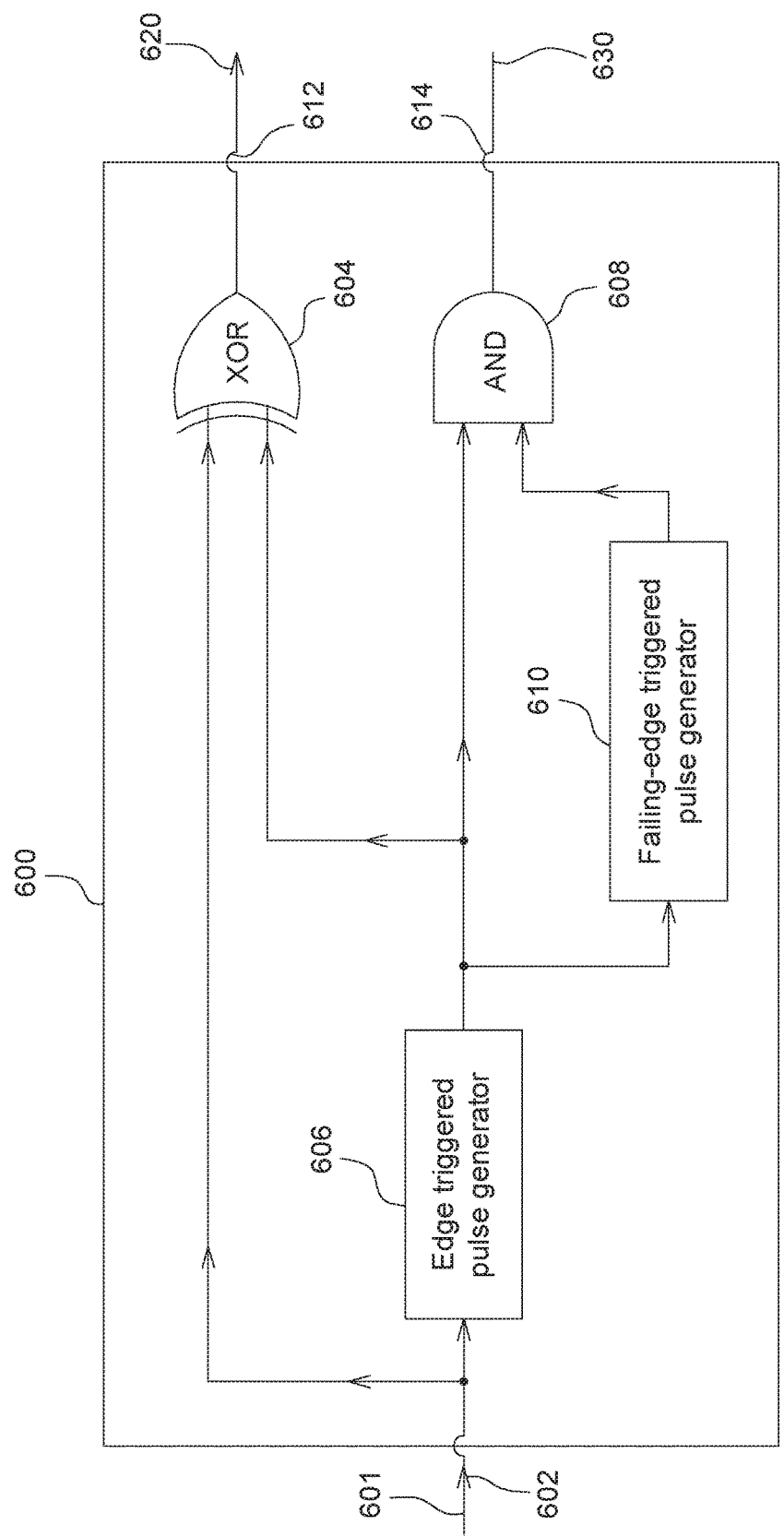
FIG. 6A illustrates a voltage command generator for controlling a parallel inverter scheme used in an inverter switching circuit shown in FIG. 4A, according to an example embodiment.

FIG. 6A illustrates a voltage command generator for controlling a parallel inverter scheme used in an inverter switching circuit shown in FIG. 4A, according to an example embodiment. FIG. 6B illustrate a form of a control command, according to one example embodiment.

As shown in FIG. 6A, a voltage command generator 600, receives a control command 601 at input 602 (e.g., any one of Va*, Vb* and Vc*). The control command 601 received at the input 602 of the voltage command generator 600 may be a standard control command such as the control command 650 shown in FIG. 6B.

In one example embodiment, upon receiving the control command 650, the control command is fed to the logical XOR gate 604 of the voltage command generator 600. Furthermore, as soon as a rising edge of the control command 650 is detected by an edge triggered pulse generator 606 of the voltage command generator 600, the edge triggered pulse generator 606 generates a pulse, which is supplied to the logical XOR gate 604. The logical XOR gate 604, based on the received control command 650 and the pulse generated by the edge triggered pulse generator 606, outputs a control command 620 (e.g., a high command or a low command) at the output 612 of the voltage command generator 600, to be provided to the conducting inverter (e.g., the inverter circuit 350) of the inverter switching circuit 188. For example, if the control command 601 received at the input 602 is Va*, then the output 620 of the logical XOR gate 604 will be fed to either the gate of the switch 354 or the gate of the switch 356 corresponding to phase A1 of the inverter circuit 350.

Furthermore, the pulse generated by the edge triggered pulse generator 606 is also provided as one input to a logical NAND gate 608 of the voltage command generator 600. A falling-edge triggered pulse generator 610, upon detecting a falling edge of the pulse generated by the edge triggered pulse generator 606, generates a pulse, which is provided as another input to the logical NAN gate 608. Using the pulse generated by the edge triggered pulse generator 606 and the pulse generated by the falling-edge triggered pulse generator 610, the logical NAND gate 608 outputs a control command 630 at the output 614 of the voltage command generator 600, to be provided to the switching inverter (e.g., the inverter circuit 370) of the inverter switching circuit 188. For example, if the control command 601 received at the input 602 is Va*, then the output 630 of the logical NAND gate 608 will be fed to either the gate of the switch 374 or the gate of the switch 376 corresponding to phase A2 of the inverter circuit 350.

While the above example embodiment in relation to FIG. 6 has been described using Va* as the input and the outputs 620 and 630 being fed to phase 1 of the inverter circuits 350 and 370, respectively, example embodiments are not limited thereto. The input command at the input 602 may be any one of Va*, Vb* and Vc*, shown in FIG. 1A, with the corresponding output being fed to Phases B1/B2 or C1/C2 of the inverter circuits 350 and 370.

Accordingly, by using a voltage command generator such as the voltage command generator 600 described above with reference to FIG. 6, a hardware implementation of switching states (switching between example State 1 and example State 2) is possible, as opposed to programming the electronic data processing system 120 to provide state specific command signals, as described with reference to FIGS. 4A, 4B and 5.

As an alternative to the above example embodiments (described with reference to FIGS. 4A, 4B, 5, 6A and 6B) for implementing a parallel inverter scheme, in yet another example embodiment, state specific control commands may be provided via passive circuit modifications to the parallel inverter scheme shown in FIG. 4A, as will be described below.

Figure 7:
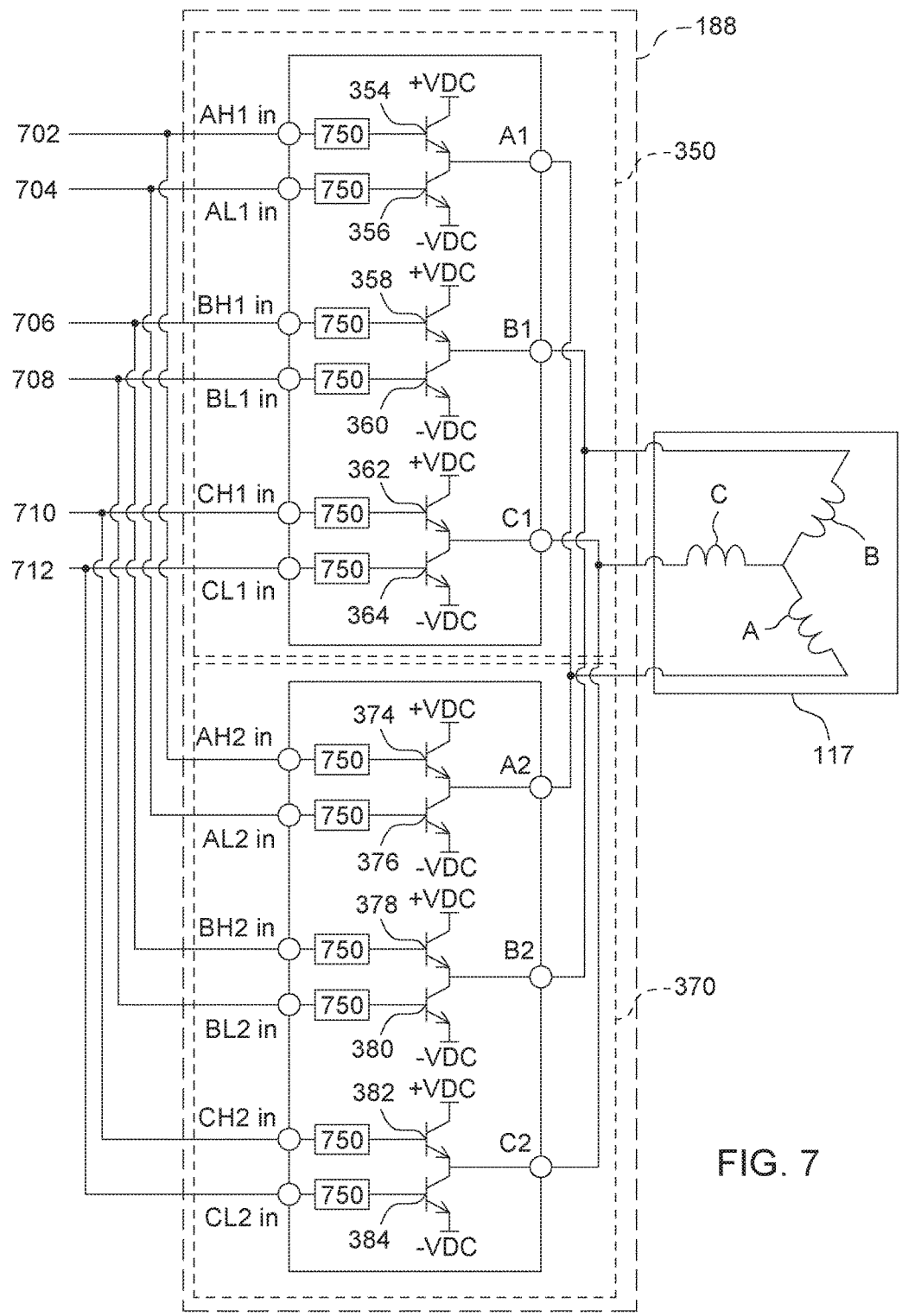
FIG. 7 illustrates a parallel inverter scheme, according to one example embodiment.

FIG. 7 illustrates a parallel inverter scheme, according to one example embodiment. FIG. 7 illustrates the inverter switching circuit 188 coupled to the load 117, in a similar manner as shown in FIG. 4A. The common components in FIGS. 4A and 7 are numbered the same and therefore the descriptions thereof will be omitted for sake of brevity.

In one example embodiment, the control commands 702-712 are provided by the electronic data processing system 120. Control command 702 provides high voltage command to the gate of the switch 354 (AH1) of the inverter circuit 350 and/or the switch 374 (AH2) of the inverter circuit 370 via a delay circuit 750. The delay circuit 750 may be any known or to be developed delay circuit. Control command 704 provides low voltage command to the gate of the switch 356 (AL1) of the inverter circuit 350 and/or the switch 376 (AL2) of the inverter circuit 370 via the delay circuit 750. Control command 706 provides high voltage command to the gate of the switch 358 (BH1) of the inverter circuit 350 and/or the switch 375 (BH2) of the inverter circuit 370 via the delay circuit 750. Control command 708 provides low voltage command to the gate of the switch 360 (BL1) of the inverter circuit 350 and/or the switch 380 (BL2) of the inverter circuit 370 via the delay circuit 750. Control command 710 provides high voltage command to the gate of the switch 362 (CH1) of the inverter circuit 350 and/or the switch 382 (CH2) of the inverter circuit 370 via the delay circuit 750. Finally, control command 712 provides low voltage command to the gate of the switch 364 (CL1) of the inverter circuit 350 and/or the switch 384 (CL2) of the inverter circuit 370 via the delay circuit 750.

The operation of the parallel inverter scheme utilized in the inverter switching circuit 188 (e.g., operation of the conducting and switching inverters according to different states such as example states 1 and 2 described above), as shown in FIG. 7, is controlled through hardwired delay circuits 750, depicted in FIG. 7. In one example embodiment, delay circuits 750, as controlled by a processor executing computer-readable instructions, adjust the application of the corresponding one of the control commands 702-712 to the gate of the corresponding transistors 354-364 of the inverter circuit 350 and the transistors 374-384 of the inverter circuit 370 thus providing the appropriate activation and/or deactivation of the conducting and switching circuits (inverter circuit 350 and inverter circuit 370 respectively), in accordance with the process described in FIG. 5.

Example embodiments being thus described, it will be obvious that the same may be varied in many ways. Such variations are not to be regarded as a departure from the spirit and scope of example embodiments, and all such modifications as would be obvious to one skilled in the art are intended to be included within the scope of the claims.

The patent claims filed with the application are formulation proposals without prejudice for obtaining more extensive patent protection. The applicant reserves the right to claim even further combinations of features previously disclosed only in the description and/or drawings.

What is claimed is:

1. A controller coupled to a first inverter and a second inverter forming a parallel inverter scheme, the first inverter and the second inverter configured to provide power to a load, the controller configured to:
   control the first inverter to operate according to a first switching state while the second inverter is off;
   turn on the second inverter such that the first inverter and the second inverter simultaneously operate according to the first switching state to share current during a first zero voltage switching (ZVS) period before the first inverter is turned off;
   turn off the first inverter after the first ZVS period and before a transition from the first switching state to a second switching state;
   control the second inverter to operate during the transition from the first switching state to the second switching state while the first inverter is off;
   turn on the first inverter after the transition such that the first inverter and the second inverter simultaneously operate according to the second switching state to share the current during a second ZVS period before the second inverter is turned off;
   turn off the second inverter after the second ZVS period; and
   control the first inverter to operate according to the second switching state.

2. The controller of claim 1, wherein
   the first inverter includes a first plurality of pairs of switches,
   the second inverter includes a second plurality of pairs of switches, and
   while controlling the second inverter to operate during the transition, the controller is configured to turn on one or more of the second plurality of pairs of switches of the second inverter corresponding to one or more of the first plurality of pairs of switches of the first inverter that operate differently in the second switching state compared to the first switching state.

3. The controller of claim 1, wherein
   the first inverter is comprised of a first plurality of transistors, and
   the second inverter is comprised of a second plurality of transistors.

4. The controller of claim 3, wherein each of the first plurality of transistors and the second plurality of transistors are power switches.

5. The controller of claim 1, wherein the controller is configured to supply a first set of voltages to the first inverter and a second set of voltages to the second inverter for controlling the first inverter and the second inverter based on current requirements and feedback from the first inverter and the second inverter.

6. A voltage command generator coupled to a parallel inverter scheme including a first inverter and a second inverter, the voltage command generator configured to,
   receive a plurality of voltage commands from a machine controller; and
   generate a plurality of control commands based on each of the plurality of voltage commands to,
      control the first inverter to operate according to a first switching state while the second inverter is off,
      turn on the second inverter such that the first inverter and the second inverter simultaneously operate according to the first switching state to share current during a first zero voltage switching (ZVS) period before the first inverter is turned off,
      turn off the first inverter after the first ZVS period and before a transition from the first switching state to a second switching state,
      control the second inverter to operate during the transition from the first switching state to the second switching state while the first inverter is off,
      turn on the first inverter after the transition such that the first inverter the second inverter simultaneously operate according to the second switching state to share the current during a second ZVS period before the second inverter is turned off,
      turn off the second inverter after the second ZVS period, and
      control the first inverter to operate according to the second switching state.

7. The voltage command generator of claim 6, wherein
   the first inverter includes a first plurality of pairs of switches,
   the second inverter include a second plurality of pairs of switches, and while controlling the second inverter to operate during the transition, the voltage command generator is configured to generate one or more control commands to turn on one or more of the second plurality of pairs of switches of the second inverter corresponding to one or more of the first plurality of pairs of switches of the first inverter that operate differently in the second switching state compared to the first switching state.

8. The voltage command generator of claim 6, wherein the first inverter is comprised of a first plurality of transistors, and the second inverter is comprised of a second plurality of transistors.

9. The voltage command generator of claim 8, wherein each of the first plurality of transistors and the second plurality of transistors are power switches.

10. The voltage command generator of claim 6, wherein the machine controller is configured to provide the plurality of voltage commands according to current requirements and feedback from the first inverter and the second inverter.

11. A parallel inverter scheme comprising:

a first inverter and a second inverter configured to operate according to a plurality of voltage commands received from a machine controller such that, the first inverter is configured to operate according to a first switching state while the second inverter is off, and the second inverter is configured to turn on such that the first inverter and the second inverter simultaneously operate according to the first switching state to share current during a first zero voltage switching (ZVS) period before the first inverter is turned off, the first inverter is configured to turn off after the first ZVS period and before a transition from the first switching state to a second switching state, the second inverter is configured to operate during the transition from the first switching state to the second switching state while the first inverter is off, the first inverter is configured to turn on after the transition such that the first inverter and the second inverter simultaneously operate according to the second switching state to share current during a second ZVS period before the second inverter is turned off, the second inverter is configured to turn off after the second ZVS period, and the first inverter is configured to operate according to the second switching state.

12. The parallel inverter scheme of claim 11, wherein the first inverter includes a first plurality of pairs of switches, the second inverter include a second plurality of pairs of switches, and while operating during the transition, the second inverter is configured to turn on one or more of the second plurality of pairs of switches of the second inverter corresponding to one or more of the first plurality of pairs of switches of the first inverter that operate differently in the second switching state compared to the first switching state.

13. The parallel inverter scheme of claim 11, wherein the first inverter is comprised of a first plurality of transistors, and the second inverter is comprised of a second plurality of transistors.

14. The parallel inverter scheme of claim 13, wherein each of the first plurality of transistors and each of the second plurality of transistors are power switches.

15. The parallel inverter scheme of claim 11, wherein the machine controller is configured to provide the plurality of voltage commands according to current requirements and feedback from the first inverter and the second inverter.

* * * * *